Feb. 3, 1959
L. C. WATERMAN ET AL
2,872,408
ELECTRIC TREATER AND METHOD
Filed Oct. 19, 1955
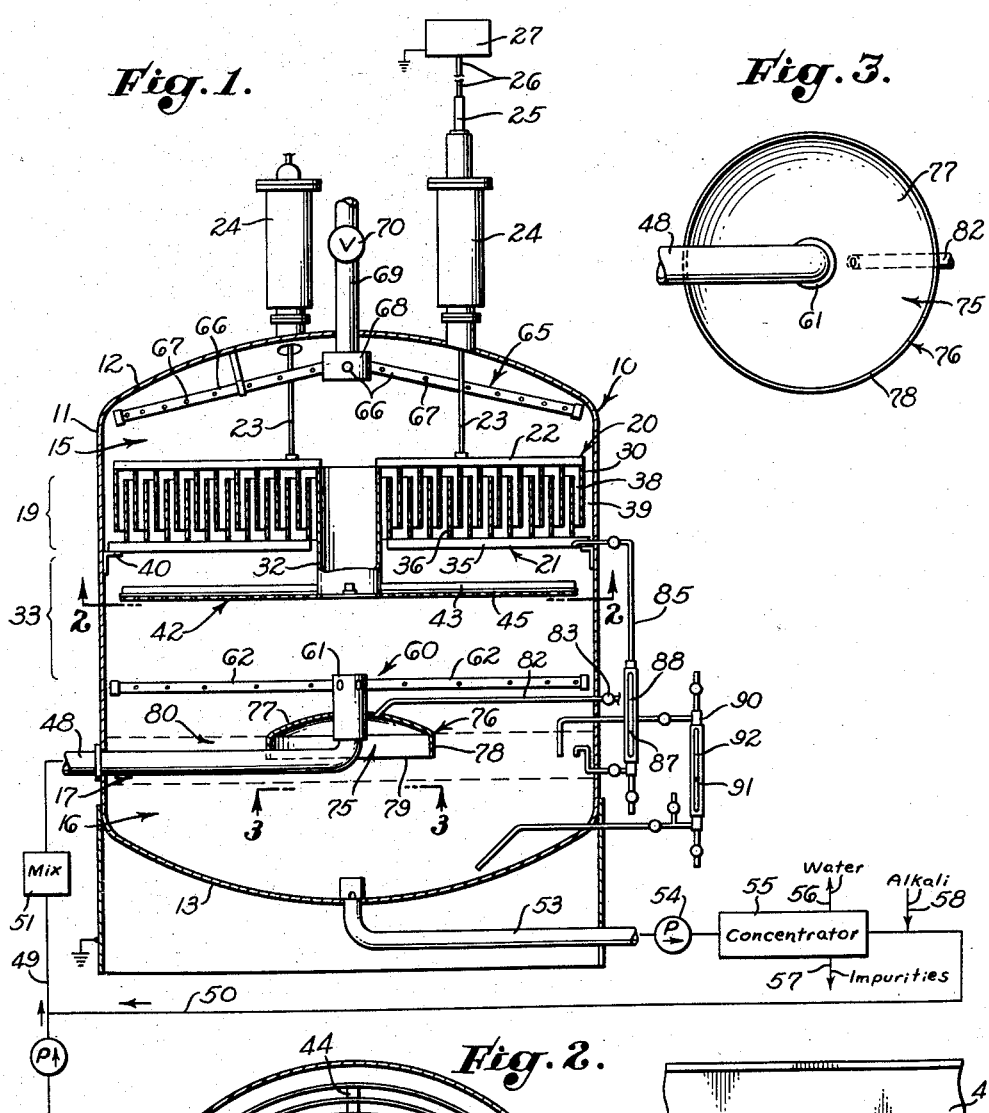
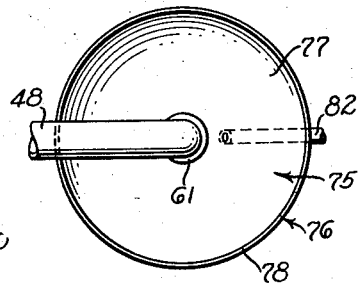
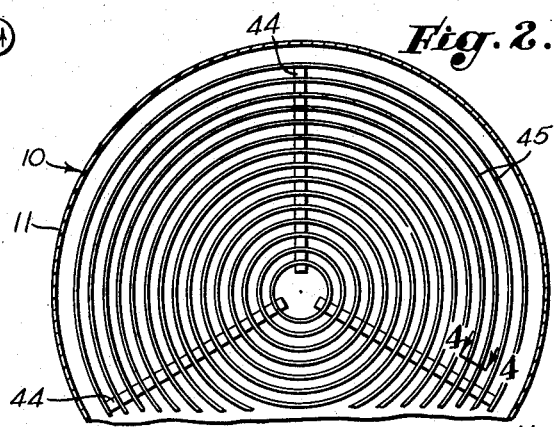
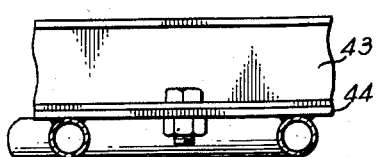
INVENTORS.
LOGAN C. WATERMAN
WILLIAM L. SHIRLEY
BY THEIR ATTORNEYS.
HARRIS, KIECH, FOSTER & HARRIS

United States Patent Office 2,872,408
Patented Feb. 3, 1959

2,872,408

ELECTRIC TREATER AND METHOD

Logan C. Waterman and William L. Shirley, Houston, Tex., assignors to Petrolite Corporation, Wilmington, Del., a corporation of Delaware Application October 19, 1955, Serial No. 541,406

7 Claims. (Cl. 204—302)

Our invention relates to a method and a device for withdrawing from a settling chamber a third phase liquid which forms in an intermediate zone between upper and lower phases respectively in upper and lower zones of the settling chamber. More particularly, it relates to electric emulsion treaters of the type in which three phases form, the invention involving a novel method and apparatus for withdrawing the third phase, by which term we have reference to the liquid in such intermediate zone or a portion or component thereof.

The electric treatment of certain oil-continuous emulsions coalesces the droplets of dispersed phase material into masses of sufficient size to gravitate from the oil. In conventional treaters, the oil phase collects as a body in the upper end of the tank while the coalesced phase collects as a body in the lower end of the tank. Often there is a layer of sludge in an intermediate zone between such bodies, representing material which is in the process of separation. In some processes, it is desirable to withdraw this sludge or to provide a supplemental zone within the treater to facilitate its separation. The invention is suited to such an operation.

Other three-phase separations are encountered in the electrical-chemical processing or refining of petroleum products. For example, if certain reagents are emulsified with a petroleum product to react with certain constituents thereof, and if the resulting emulsion is electrically treated to coalesce the dispersed droplets, separation into three layers is sometimes found to take place. In some instances, the third or intermediate layer may represent a valuable product, which will desirably be removed from the treater. In other instances, such a third or intermediate layer or phase may contain the reaction products, desirably removed from the treater.

Illustrative of the latter is a process for treating petroleum distillates with a reagent comprising rather concentrated sodium hydroxide or potassium hydroxide solutions containing sodium or potassium cresylates resulting from reactive contact between the alkali and cresylic acids of the petroleum during the same or a previous use of the alkali. For example, a sodium hydroxide solution may be withdrawn from the bottom of an electric treater, concentrated, and remixed with a petroleum distillate entering the treater. Under appropriate conditions, the electrically treated constituents will separate into a first or upper body of distillate, a second or lower body of sodium hydroxide solution and a third or intermediate layer containing sodium cresylate. This third layer may be composed, at any instant of time, of a major portion of sodium hydroxide and a minor portion of sodium cresylate, the former being transiently present in its migration to the lower body. The present invention is capable of effecting further separation of this composite material and withdrawing cresylate from the intermediate layer while containing little or no sodium hydroxide.

In this connection, the sodium hydroxide is initially mixed with or emulsified with the distillate to produce minute droplets of alkali in a continuous phase of the distillate. The alkali progressively reacts with the acids of the distillate, including cresylic acids, the reaction products being associated with the alkali droplets both before and after electrical coalescence of the latter. In other words, the reaction products settle with the coalesced alkali masses, being either within the coalesced mass or at the interface. Relatively large volumes of the coalesced alkali masses are thus continuously raining through the aforesaid third or cresylate layer, thus tending to prevent clean separation of the alkali and the cresylate in the main settling chamber.

We have found that if such third layer material is subjected to an auxiliary settling action in the vicinity of the intermediate zone, substantial additional separation will be effected. It is an important object of the present invention to provide an apparatus for accomplishing this.

More specifically, it is an object of the invention to provide an auxiliary or inverted settling zone open at its lower end to such third or intermediate layer; also to shield the auxiliary settling zone from the settling coalesced masses raining toward such a third layer.

A further object of the invention is to guide the coalesced masses toward a passage between the walls defining the auxiliary settling zone and the walls of the main tank. In this connection, it is an object of the invention to use an inverted cup with its lip disposed in the zone in which the third phase collects, the interior of the cup forming an auxiliary settling zone shielded from the rain of coalesced masses. In this settling zone, the alkali settles from the cresylate or other product, permitting the latter to be withdrawn continuously to a position outside the main tank.

A further object of the invention is to provide a novel electrode arrangement for an electric emulsion treater.

Further objects and advantages of the invention will be evident to those skilled in the art from the following description of an exemplary embodiment, which will be described as applied to the removal of cresylate from such a third or intermediate layer within an electric treater, this embodiment being purely exemplary.

Referring to the drawing:

Fig. 1 is a vertical sectional view of an electric treater embodying the invention;

Figs. 2 and 3 are cross-sectional views respectively taken along corresponding lines 2—2 and 3—3 of Fig. 1; and Fig. 4 is a detailed sectional view taken along the line 4—4 of Fig. 2.

The drawing illustrates an electric emulsion treater 10 providing a tank 11 closed by upper and lower heads 12 and 13. The tank provides an upper zone 15 adapted to contain a body of the separated upper phase, a lower zone 16 adapted to contain a body of the separated lower phase, and an intermediate zone 17 adapted to contain a body or layer of a third phase. In the exemplary embodiment, the first phase will be considered as a petroleum distillate, the second phase as a sodium hydroxide solution and the third phase as comprising cresylate. The tank 11 is shown as an upright cylinder, but it should be understood that the invention is not limited thereto.

In a main treating zone 19 of the tank 11 are positioned upper and lower electrodes 20 and 21. The upper electrode includes a foraminous framework 22 suspended by rods 23 from insulators positioned in insulator housings 24, one of which includes an inlet bushing 25 to which is connected a cable 26 leading to a suitable source of high voltage potential 27. In the exemplified process, this source of potential is desirably a unidirectional source, albeit in other processes and with other types of electrodes, a high voltage alternating current source can be employed. One terminal of the high voltage source 27 is grounded, as is also the tank 11. The other terminal is connected through the cable 26 and one of the rods 23 to the upper electrode 20 to energize same.

Depending from the framework 22 are concentric cylindrical electrode members 30 formed of metal and electrically connected to the framework. These electrode members 30 are equally spaced and are of equal height, except the innermost cylindrical member 32 which depends into an auxiliary treating zone 33.

The lower electrode 21 includes a foraminous framework 35 supporting metal cylindrical electrode members 36 spaced equally from each other and bisecting the spaces between the electrode members 30 to form a plurality of open-ended treating spaces 38 of equal width. A treating space 39 of the same width is formed between the outermost electrode member 30 and the tank 11. The lower electrode 21 is supported and electrically connected to the tank 11 by brackets 40, being thus at ground potential.

Supported by the innermost cylindrical electrode member 32 in the auxiliary treating zone 33 is a foraminous auxiliary lower electrode 42 comprising a framework 43 made of channel iron (Fig. 4), one flange of the channel being bolted to strips 44 to which are welded a plurality of concentric ring members 45 which may be formed of rods or pipes.

The dispersion or emulsion to be treated enters the treater 10 through a pipe 48 and may be produced, for example, by bringing together streams of oil and reagent at the junction of pipes 49 and 50. The dispersion thus formed may, if desired, be additionally mixed in a mixer 51 communicating with the pipe 48. In the system shown, a sodium hydroxide solution is continuously withdrawn from the lower zone 16 of the tank 11 through a pipe 53, being pressured by a pump 54 and delivered to a concentrator 55 where water and, if desired, impurities may be removed therefrom, as indicated by the arrows 56 and 57. Make-up alkali may be introduced by a suitable proportioning pump, not shown, into the pipe 50, as indicated by the numeral 58.

The pipe 48 supplies a distributor 60 including a manifold member 61 from which radially extend perforated pipes 62 closed at their outer ends, the perforations being progressively closer together toward the closed ends to distribute the emulsion uniformly throughout the cross-sectional area of the tank, creating a tank-filling stream of the emulsion rising toward the electrodes. This rising stream is treated first by a high-voltage field below the auxiliary lower electrode 42, this field extending to the grounded distributor 60. After passing through the interstices of this auxiliary lower electrode, the rising stream is treated in a high-voltage field between this electrode and the lower electrode 21. The rising stream is then divided into annular streams by the lower edges of the cylindrical electrode members 36, each annular stream being further divided by the lower edges of the cylindrical electrode members 30 of the upper electrode 20. The resulting annular streams rise side-by-side through the open-ended treating spaces 38, preferably in substantially laminar flow, the effluent streams combining in the upper zone 15.

During the rise of the emulsion through the several zones, the dispersed phase thereof is progressively coalesced, forming coalesced masses of sufficient size and density to settle against the rising stream. The remaining treated oil comprises a separated upper phase in the upper zone 15 and can be continuously withdrawn therefrom by a collector 65 which desirably withdraws the treated oil from a plurality of distributed positions in a manner assisting in producing an upward columnar flow in the tank through the several treating spaces. As shown, the collector provides a plurality of pipes 66 having perforations 67 spaced closer toward the closed ends of the pipes, these pipes radiating from a manifold 68 from which the treated oil is withdrawn through an effluent pipe 69 having a suitable back pressure valve 70.

The invention includes an auxiliary settling zone 75 within the tank 11 having an open lower end opening downwardly on an intermediate zone 17. As show, this auxiliary settling zone is formed within an inverted cup 76 having a wall or deck 77 sloping downwardly to a lip 78 having a lower edge 79 terminating within the intermediate zone 17. The inverted cup 76 is supported by the emulsion-delivery means, being typically secured to the manifold member 61 of the distributor 60 in which event a portion of the pipe 48 and of the manifold member may be disposed within the auxiliary settling zone 75.

The horizontal cross-sectional area of the auxiliary settling zone 75 is only a fraction of that of the tank 11 at the level of the lip 78 to leave an annular passage 80 between the lip 78 and the tank 11 through which the coalesced masses of the lower phase may settle on their way to the lower zone 16. The inverted cup 76 shields the material in the auxiliary settling zone 75 from the lower-phase masses settling through the intermediate zone 17, thus providing a quiescent zone in which further separation of the third phase mixture can take place. By way of example, in the aforesaid cresylate process, any masses of alkali can settle from the cresylate, dropping to the lower zone 16. The remaining cresylate or any other material separating in the auxiliary settling zone 75 can be continuously or intermittently withdrawn from the upper interior thereof through a pipe means 82 extending to a position outside the tank 11, this pipe means being shown as including a valve 83 which may be manually or automatically controlled to determine the flow of the third material from the treater.

It should be clear that the edge 79 of the lip 78 is not a skimmer in the preferred practice of the invention. Rather, the interfacial levels of the zones 15, 16 and 17 are preferably controlled so that the lip 78 terminates within the intermediate zone 17. To aid in this result, the invention preferably employs appropriate means for determining the interfacial levels. Thus, a first level-responsive means 85 comprises a normally-open passage with its upper and lower ends respectively opening on the upper zone 15 and on the intermediate zone 17, preferably at a position substantially horizontally opposite the edge 79, the passage thus receiving bodies of the upper and third phase liquids contacting at an interface 87 in a gauge glass or control chamber 88. Likewise, a second level-responsive means 90 comprises a normally-open passage with its upper and lower ends respectively opening on the intermediate zone 17 and a lower zone 16, the point of communication with the intermediate zone being preferably at a position substantially horizontally opposite the edge 79. The second level-responsive means thus receives bodies of the third and lower phase liquids which contact at an interface 91 in a gauge glass or control chamber 92. The interfaces 87 and 91 thus indicate or are responsive to the approximate position of the boundaries between the zones 15 and 17 and the zones 16 and 17 respectively. If desired, the positions of these interfaces 87 and 91 can be used to control the effluents from the treater in such manner as to maintain such positions substantially constant.

Various changes can be made without departing from the spirit of the invention as defined in the appended claims.

We claim as our invention:

1. In an electric emulsion treater for electric treating operations of a type in which the electrically treated emulsion constituents separate into upper and lower phases in upper and lower zones within the treater with a layer of a third phase in an intermediate zone therebetween, the combination of: a treater tank providing said zones; electrode means in said upper zone of said tank; means for energizing said electrode means; conduit means having an inlet opening for delivering the emulsion to be treated to said upper zone for electric treatment producing said electrically treated constituents; walls positioned in said tank below the level of said inlet opening and defining an auxiliary settling space having a lower open end opening downwardly on said intermediate zone, said walls being spaced from said tank to define therebetween a passage in which said lower phase may settle to said lower zone, said walls including a deck closing the upper end of said auxiliary settling space and guiding to said passage the lower phase material settling downward toward said auxiliary settling space; means for determining the upper and lower boundaries of said third phase material in said intermediate zone; pipe means for withdrawing material from the upper portion of said auxiliary settling space to the exterior of said tank; and additional pipe means for respectively withdrawing the upper and lower phases from the respective upper and lower zones of said tank.

2. A combination as defined in claim 1 in which said auxiliary settling space is wider in horizontal width than in height and in which said deck slopes downwardly toward said passage to guide said settling lower phase material to said passage.

3. A combination as defined in claim 1 in which said conduit means for delivering emulsion extend a substantial distance within said tank and wherein means are provided for supporting said walls from said conduit means.

4. A combination as defined in claim 1 in which the means for determining the upper and lower boundaries of the third phase material in said intermediate zone includes a first level-responsive means providing a passageway having upper and lower ends respectively opening on said upper zone at an upper position and on said intermediate zone at a position substantially horizontally opposite the lower open end of said auxiliary settling space to respectively receive bodies of the upper and third phases contacting at a boundary movable in response to the relative amounts of upper and third phases in said tank, and a second level-responsive means providing a passageway having lower and upper ends respectively opening on said lower zone at a lower position and on said intermediate zone at a position substantially horizontally opposite the lower open end of said auxiliary settling space to respectively receive bodies of the lower and third phases contacting at a boundary movable in response to the relative amounts of lower and third phases in said tank.

5. A method of separating a mixture of the type having constituents tending to gravitationally separate into an upper oil phase, a lower aqueous phase and an intermediate phase between said oil and aqueous phases, which method includes the steps of: electrically treating said mixture in a confined space to produce electrically treated constituents settling in said space to produce therein an upper body of said oil phase, a lower body of said aqueous phase, and a body of said intermediate phase in an intermediate zone therebetween in which intermediate zone separation of said phases is proceeding, masses of said aqueous phase settling through said intermediate zone; shielding the top and sides of a central portion of said intermediate zone from said settling masses while moving a mixture of said aqueous and intermediate phases upwardly into said shielded portion; separating at least some of the aqueous phase from such mixture in said shielded portion and withdrawing from said shielded portion the remaining material; and withdrawing streams of said oil phase and said aqueous phase from the respective bodies thereof at such relative rates as to maintain the inlet of said shielded portion within said body of intermediate material.

6. In an electric emulsion treater for electrically treating oil-continuous emulsions which tend to separate after such treatment into upper, lower and intermediate liquid phases, said treater including: a tank; electrode means in said tank spaced to define treating spaces; means for energizing said electrode means to establish coalescing electric fields in said treating spaces; means for delivering the emulsion to be treated to said electric fields for coalescence of the dispersed phase of the emulsion into masses of sufficient size to gravitate to and collect in a liquid layer in a lower zone of said tank, said masses raining through an intermediate zone on their way to said lower zone, said means being arranged to deliver emulsion to said tank at a position above said intermediate zone; a hollow separating structure providing a closed upper end and an open lower end, said separating structure being mounted in said tank below said electrodes with its open lower end below the position of delivery of said emulsion into said tank and within said intermediate zone and opening toward said lower zone; means for determining the upper and lower boundaries of the intermediate phase material in said intermediate zone; conduit means for withdrawing liquid from the upper interior of said separating structure to the exterior of said tank to draw into said open lower end thereof the liquid from the intermediate zone, said closed upper end deflecting the raining coalesced masses to an annular passage between the periphery of the separating structure and the tank; means for withdrawing the upper liquid phase from the upper interior of said tank; and means for withdrawing the lower liquid phase from said layer in said lower zone of said tank.

7. A method of separating a mixture of the type having constituents tending to gravitationally separate into an upper oil phase, a lower aqueous phase, and an intermediate reaction-products phase between said oil and aqueous phases, which method includes the steps of: electrically treating said mixture to produce electrically treated constituents; continuously delivering to a settling zone such electrically treated constituents and settling same therein to produce an upper body of said oil phase, a lower body of said aqueous phase, and a body of intermediate material in an intermediate zone therebetween in which intermediate zone separation of said phases is proceeding, masses of said aqueous phase settling through said intermediate zone; shielding a portion of said intermediate zone at its top and sides from said settling masses while moving said reaction-products phase upwardly into an open inlet for said shielded portion; withdrawing from said shielded portion a substantially single-phase material comprising said reaction products substantially free of dispersed particles of said oil and aqueous phases; and withdrawing streams of said oil phase and said aqueous phase from the respective bodies thereof at such relative rates as to maintain said inlet of said shielded portion within said body of intermediate material.

References Cited in the file of this patent

UNITED STATES PATENTS

| | | |
|---|---|---|
| 1,838,977 | Worthington | Dec. 29, 1931 |
| 2,027,615 | Prutzman | Jan. 14, 1936 |
| 2,377,565 | McDonald | June 5, 1945 |

OTHER REFERENCES

Direct Sludge Heating, by The Carball Bulletin No. 24S48, 1950, published by Walker Process Equipment, Inc., 518 Hankes Avenue, Aurora, Illinois.